United States Patent [19]

Breglia et al.

[11] Patent Number: 4,571,631
[45] Date of Patent: Feb. 18, 1986

[54] CIG DISTORTION CORRECTION WITH DELAY LINES

[75] Inventors: Denis R. Breglia, Altamonte Springs; Benjamin W. Patz, Orlando, both of Fla.

[73] Assignee: The United States of America as represented by the Secretary of the Navy, Washington, D.C.

[21] Appl. No.: 595,876

[22] Filed: Apr. 2, 1984

[51] Int. Cl.⁴ .............................................. H04N 5/74
[52] U.S. Cl. .................................... 358/231; 358/237
[58] Field of Search ................ 358/231, 237, 160, 87, 358/60, 163, 235; 364/571, 518, 521

[56] References Cited

U.S. PATENT DOCUMENTS 4,125,862 11/1978 Catano .
4,152,725 5/1979 Beckmann .
4,153,915 5/1979 McKechnie .
4,163,249 7/1979 Michael .
4,228,465 10/1980 Stone .

Primary Examiner—John C. Martin
Assistant Examiner—Howard L. Carter
Attorney, Agent, or Firm—Robert F. Beers; Robert W. Adams

[57] ABSTRACT

Distortion occurring when tan $\theta$ mapped CIG video is projected onto a wide angle non-tan $\theta$ display is corrected in both line direction and cross-line direction by varying the propagation time of the pixels within a line to achieve a non-distorted line and by buffering the lines of the display to allow for selective fetching of lines for display in a non-distorted manner. Both pixels and lines are delayed by variable amounts in accordance with their temporal location within a line or frame, respectively.

12 Claims, 4 Drawing Figures

CIG DISTORTION CORRECTION WITH DELAY LINES

BACKGROUND OF THE INVENTION

In general, this invention relates to distortion in wide angle display systems and in particular to wide angle display systems wherein the display is generated by a raster scan performed by a modulated laser.

More particularly, this invention relates to a means for correcting pixel distortion occurring in $\theta$ mapped displays such as those presented by wide angle projectors driven by computer image generation.

Distortion in laser raster display systems may be considered as pixel displacements from their proper angular direction when viewed by the observer. Conventional techniques for correcting distortion include: CIG pre-distortion in which the CIG system generating the image remaps locations of computed pixels; and optical distortion compensation in which optical components are used to remap pixel locations. The CIG pre-distortion technique is expensive both in dollars and in decreased system detail capacity; also, CIG pre-distortion must be redesigned for different CIG implementations. The optical distortion correction technique doesn't work for wide angle displays where tan $\theta$ lens mapping functions are impossible to implement.

SUMMARY OF THE INVENTION

The invention herein described overcomes some of the problems of the prior art in that it is capable of being implemented independent of the CIG with any optical system. Generally speaking, the invention employs a technique which changes the pixel rate or the time at which a pixel is displayed. The result is a way of correcting the distortion by changing the propagation time between the CIG and the display. The CIG output consists of a sequence of modulation values which are equally spaced in time along a raster scan line. Each modulation value produces a pixel. Since CIG systems compute and output pixels based on tan $\theta$ mapping (i.e., as if pixels project to a square matrix of points on a flat plane normal to the viewing direction), a display projector having any other type of mapping function will result in a distorted image. Through the use of a storage and retrieval system, the output pixels of the CIG can be buffered and retrieved at a variable rate to enable the resultant display to appear undistorted. Since the projector pixel size will then vary relative to the CIG pixel size, as measured in a flat plane normal to the projection direction, it is also necessary to provide a means for producing several projector pixels from one CIG pixel and for producing a single projector pixel from several CIG pixels.

Thus it is an object of the invention to correct wide field of view distortions in raster scan displays utilizing tan $\theta$ mapped CIG and non-tan $\theta$ mapped projection.

Another object of the invention is to provide a wide angle CIG distortion correction system which can operate independently from and external to the particular CIG system.

Yet another object of the invention is to provide a CIG distortion correction system which does not degrade the CIG operation by reducing the system detail capacity.

Other objects, advantages and novel features may be discerned from the following description which, when taken in conjunction with the appended drawings, presents a preferred embodiment of the invention defined by the claims herein.

DESCRIPTION OF A PREFERRED EMBODIMENT

Figure 1A:
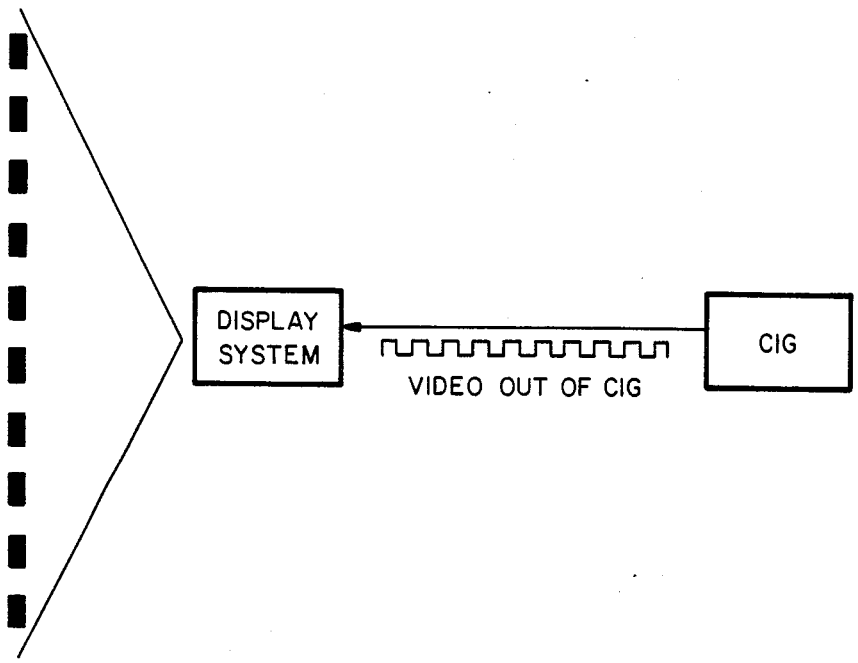
FIG. 1a is a representation of a bar taget as displayed from a tan $\theta$ CIG with tan $\theta$ mapping.
Figure 1B:
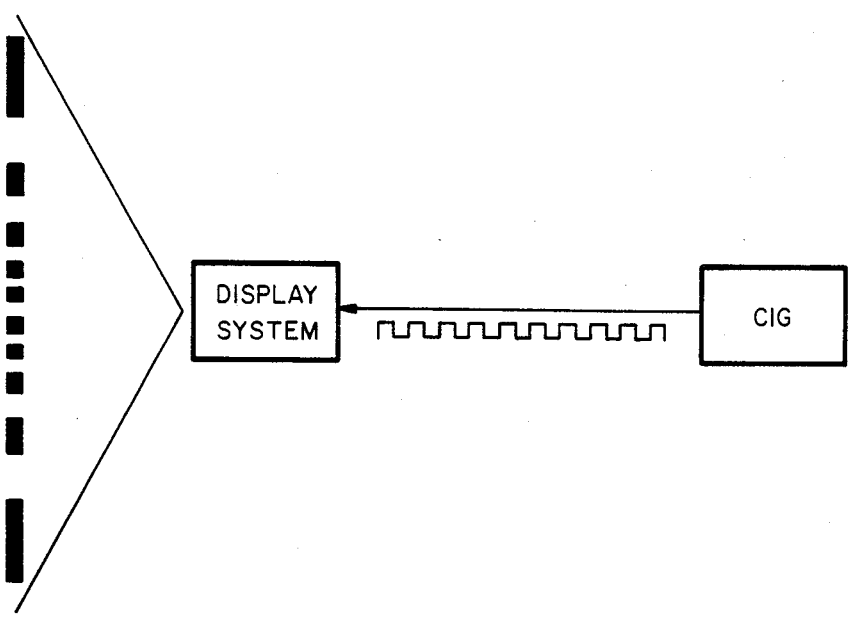
FIG. 1b is a representation of a bar target as displayed from a tan $\theta$ CIG with $\theta$ mapped display, which is representative of a non-tan $\theta$ mapped projection.

Consider the computation and display of a bar target subtending 140° as depicted in FIGS. 1a and 1b. A conventional, tan $\theta$, CIG produces a video signal for a line scan which is a square wave in time. If this square wave is used to modulate a $\theta$ mapped raster scan display, the resultant image will have the distortion pictured in FIG. 1b compared to FIG. 1a.

In terms of timing, the distorted image can be corrected by altering the time it takes for the modulated signal to be transmitted from the CIG to the display. By way of example, if the situation pictured in FIGS. 1a and 1b represents a luminance distribution along a scan line of a 1023 line/frame raster display, the total line time is approximately 32.6 microseconds and the displayed line time is approximately 25 microseconds. If the CIG pixel rate is 40 megapixels/second, a thousand pixels will be computed for each line. Consider the luminance transitions as provided by the CIG to occur at the computed pixel number and times indicated in Table I, columns (a), (b), and (c).

As pictured in FIG. 1b, if the edge transitions are sent to the $\theta$ mapped display with no change in timing, a distorted image is produced. If the propagation time for the pixels between the CIG and the display is properly altered, the image may be undistorted at the display. Columns (d) and (e) of Table I indicate the required times for the transition pixels to reach the $\theta$ display and the difference thereof from the computed time.

Inasmuch as pixels cannot have negative delays, i.e., a pixel cannot be displayed before the CIG creates it, the delay system

TABLE I

| | | Computed Transitions | | |
|---|---|---|---|---|
| (a) Transition No. | (b) Pixel No. | (c) Time (Nanosec) (Uncorrected) | (d) Time (Nanosec) (Corrected) | (e) Δ (Nanosec) |
| 1 | 25 | 625 | 172 | −453 |
| 2 | 75 | 1875 | 568 | −1307 |
| 3 | 125 | 3125 | 1051 | −2073 |
| 4 | 175 | 4375 | 1651 | −2723 |
| 5 | 225 | 5625 | 2410 | −3215 |
| 6 | 275 | 6875 | 3387 | −3488 |
| 7 | 325 | 8125 | 4664 | −3460 |
| 8 | 375 | 9375 | 6342 | −3032 |
| 9 | 425 | 10625 | 8501 | −2124 |
| 10 | 475 | 11875 | 11103 | −771 |
| Center | 500 | 12500 | 0 | 0 |
| 11 | 525 | 13125 | 13896 | +771 |
| 12 | 575 | 14375 | 16499 | +2124 |
| 13 | 625 | 15625 | 18657 | +3032 |
| 14 | 675 | 16875 | 19330 | +3460 |
| 15 | 725 | 18125 | 21613 | +3488 |
| 16 | 775 | 19375 | 22590 | +3215 |

TABLE I-continued

| (a) Transition No. | (b) Pixel No. | Computed Transitions | | (e) Δ (Nanosec) |
|---|---|---|---|---|
| | | (c) Time (Nanosec) (Uncorrected) | (d) Time (Nanosec) (Corrected) | |
| 17 | 825 | 20625 | 23348 | +2723 |
| 18 | 875 | 21875 | 23948 | +2073 |
| 19 | 925 | 23125 | 24432 | +1307 |
| 20 | 975 | 24375 | 24828 | +453 | must result in asynchronous operation. The CIG must be allowed to operate about 3500 nanoseconds ahead or behind the display to compensate for distortion in the line scan direction. When distortion in the cross line or frame direction is considered, the CIG must operate approximately 2.5 milliseconds ahead or behind the display. Given these parameters, a suitable delay system can be designed as pictured in FIG. 3, and it is contemplated that a number of particular embodiments will be developed by the artisan in the field in conformity with the novel approach disclosed herein.

Figure 3:
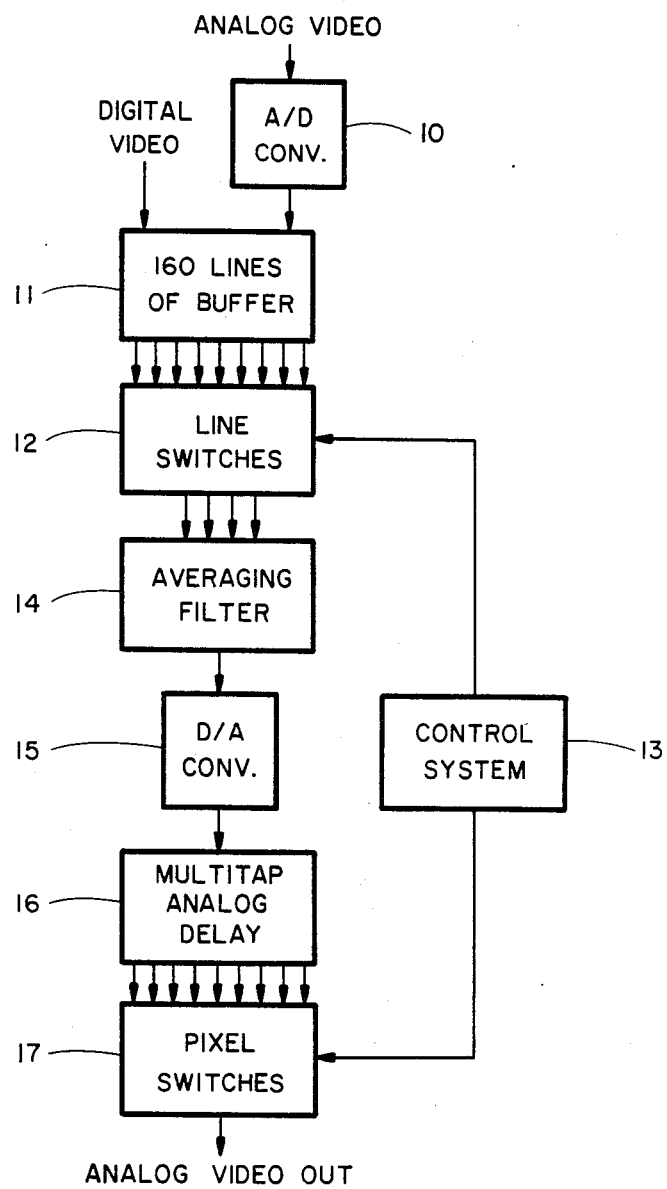
FIG. 3 is a block diagram of the hardware mechanization of the distortion correction system.

With reference to FIG. 3, the input to the hereindescribed correction system is presumed to be 1023 lines per frame, 25 nanoseconds per pixel, 30 hertz frame rate digital video. Of course such parameters are intended to be illustrative rather than limiting, inasmuch as the invention may be configured to perform on digital video inputs of various parameters. As one alternative, a preinput stage 10 may be included to convert analog to digital video for input. This would be required if the CIG output modulation were analog video rather than a discrete sequence of pixel modulation values.

A buffer 11 is provided to allow the CIG to be as much as 80 lines ahead or behind the display, thereby yielding the 2.5 millisecond variation required for distortion correction in the cross-line direction. A one hundred sixty line circulating buffer is used such that line 161 replaces line 1 after the buffer has been filled. Buffer 11 must load lines at the digital video rate and read out as many as four lines simultaneously at the 1023 line/frame rate.

Figure 2:
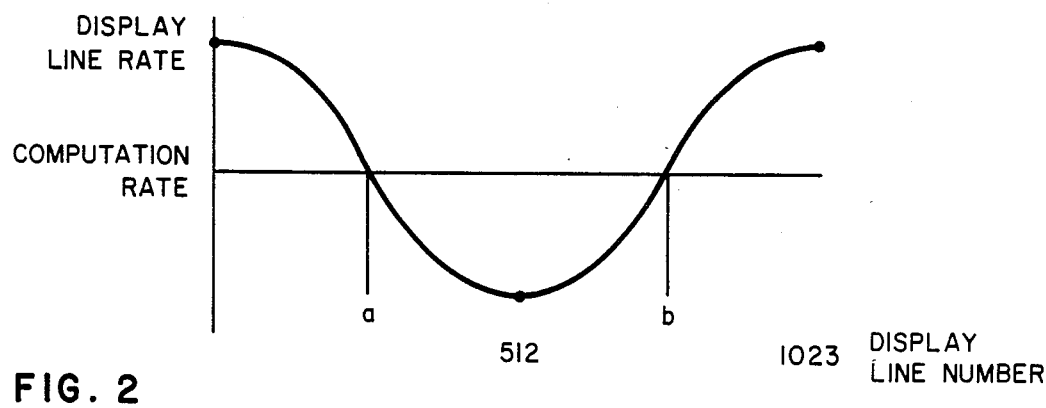
FIG. 2 illustrates the display distortion of tan $\theta$ to $\theta$ mapping.

FIG. 2 complements FIG. 1b, and illustrates the necessity of buffer 11. FIG. 2 illustrates that the time to display half a field, line 0 to 511, is very nearly the same as the time required to calculate the lines in half a field. However, the display rate is higher than the computation rate, shown as the abscissa in FIG. 2, during the first and last portion of the display field, while the display rate is slower during the central portion of the display field. Hence, the difference between the line being calculated and stored in the buffer and the line being fetched for display will be about 80 for the first line, center line, and the last line. The difference will approach zero in the vicinity of lines a and 160 in the vicinity of b, as shown in FIG. 2.

The line switches 12 may be considered to be part of buffer 11 as they select the lines in the buffer which contribute to the line currently being displayed. The line switches are under the control of the control system 13, which makes the actual selection of lines via lines switches 12.

Averaging filter 14 actually provides variable buffer line fetching, thereby creating a display free from tan $\theta$ to $\theta$ mapped distortion in the cross line direction. FIG. 2 illustrates that a single calculated line is used for more than one display line for lines 0 to about a, and for lines b to about 1023. About one calculated line to one display line will be averaged in the vicinity of display lines a and b. Several calculated lines are averaged to create one display line between a and b of FIG. 3.

The digital to analog converter 15 converts the line images to analog video in a manner well known and for purposes well understood in the art. The output of D/A converter 15 is provided to multitap analog delay line 16 which provides taps having various amounts of fixed delay as simultaneous outputs. A number of such delay lines may be concatenated, for example: one having increments of 100 nanoseconds, followed by one having increments of 10 nanoseconds, followed by one with increments of 1 nanosecond, if such accuracy is required. Pixel switches 17 are analog switches which are set by the control system 13 at a rate about four times faster than the incoming video rate. Control system 13 controls position of line switches 12 and pixel switches 17. Control system 13 may be loaded automatically, using a TV camera as part of the calibration procedure.

It can be seen that the preceding system compensates for tan $\theta$ to $\theta$ distortion in both the cross-line and the line directions by utilizing both variable buffer line fetching, i.e., averaging, and variable pixel delay along a line.

In order to apply the technique, control system 13, which may consist of a microcomputer including a buffer memory correlated to each switch position, is loaded by a A/D converter such as from a TV camera located at the observer position during the calibration of the system.

Digital video is then input to the system from the CIG or other digital video source. The digital video is held until it is fetched at a variable rate for correcting cross-line distortion by combining or repeating the fetched lines, converting said corrected lines into analog video and delaying selected pixel equivalents of said analog signal to correct for tan $\theta$ to $\theta$ distortion in the line direction.

It should be apparent from the foregoing that the invention described herein may be applied to a number of wide angle display systems of the raster scan type, and not limited to the particular embodiment hereindescribed, but rather should be limited only by the scope of the appended claims.

What is claimed is:

1. An apparatus for correcting tan $\theta$ to non-tan $\theta$ mapping distortion in video display apparatus, comprising:
    an input for receiving digital video signals;
    means for storing said digital video signals sequentially and retrievably, operably connected to said input;
    means for selectively fetching said stored signals, operably connected to said storing means;
    means for deriving display lines from said fetched stored signals, such that said derived lines do not suffer tan $\theta$ to non-tan $\theta$ distortion in a cross-line direction;
    means for converting said derived lines into analog signals;
    means for delaying selected portions of said analog signal for tan $\theta$ to non-tan $\theta$ distortion correcting in a line;
    control means operably connected to determine the temporal corrections needed for said distortion correction and to control said fetching means and said delay means; and an output from said delaying means for outputting said corrected analog video signal.

2. The apparatus of claim 1 wherein said input means further comprises an analog to digital converter for converting analog video to digital video.

3. The apparatus of claim 1 wherein said storing means comprises a circulating buffer capable of holding sufficient digital video data to equal twice the maximum difference between the input data rate and the display data rate, said buffer being capable of being loaded at the digital video rate and reading out a plurality of lines simultaneously at the line/frame rate.

4. The apparatus of claim 3 wherein said selecting means comprises a plurality of line switches under the control of said control means.

5. The apparatus of claim 4 wherein said deriving means is an averaging filter operably connected to said line switches to combine the output thereof into a composite line, said composite line being an average when a plurality of said line switches are open and a repetition when a single line switch is open.

6. The apparatus of claim 5 wherein said delay means comprises:
  a plurality of pixel switches, each switching a segment of said analog signal of pixel equivalency; and
  a multitap analog delay line having a plurality of outputs to said pixel switches, each output being delayed a finite amount to correct for said $\tan \theta$ to $\theta$ mapping along a video line.

7. A method of correcting for $\tan \theta$ to non-tan $\theta$ distortion wide angle raster video displays, comprising:
  storing a digital video signal from a video signal source for a time;
  fetching lines of said digital video signal in accordance with the relationship of said lines to the frame;
  deriving a line for display from said fetched lines; and
  altering the propagation time of the pixel elements along said line to correct for $\tan \theta$ to non-tan $\theta$ distortion along said line in said display.

8. The method of claim 7, further comprising the step of converting analog video to digital video prior to said storing step.

9. The method according to claim 7, wherein said digital video is stored for an interval equal to twice the maximum lead or lag of the display of said video as compared to the generation of said video.

10. The method of claim 9 wherein said fetching step retrieves a plurality of lines from said buffer when said display leads the generation of video, and retrieves a signal line when said display lags the generation of video.

11. The method of claim 10 wherein said deriving step averages the fetched lines to form one display line when said display leads the generation of video, and repeats said fetched line when said display lags the generation of video.

12. The method of claim 11 wherein said altering step comprises:
  establishing a pixel propagation rate for an undistorted image;
  determining the pixel propagation rate for the $\theta$ to $\theta$ mapping distortion;
  comparing said established raster and said determined rate to yield a correction, $\Delta$, for each pixel; and
  delaying each pixel in a line by its associated $\Delta$ to achieve the established pixel propagation rate.

* * * * *